US008538790B2

(12) United States Patent
Nickerson et al.

(10) Patent No.: US 8,538,790 B2
(45) Date of Patent: Sep. 17, 2013

(54) COMPUTER-IMPLEMENTED SYSTEM AND METHOD FOR MEASURING AND REPORTING BUSINESS INTELLIGENCE BASED ON COMMENTS COLLECTED FROM WEB PAGE USERS USING SOFTWARE ASSOCIATED WITH ACCESSED WEB PAGES

(75) Inventors: Rand B. Nickerson, Highland Park, IL (US); Mark A. Treschl, Highland Park, IL (US)

(73) Assignee: OpinionLab, Inc., HIghland Park, IL (US)

( * ) Notice: Subject to any disclaimer, the term of this patent is extended or adjusted under 35 U.S.C. 154(b) by 275 days.

(21) Appl. No.: 12/886,302

(22) Filed: Sep. 20, 2010

(65) Prior Publication Data
US 2011/0022537 A1    Jan. 27, 2011

Related U.S. Application Data

(63) Continuation of application No. 11/847,676, filed on Aug. 30, 2007, now Pat. No. 7,809,602.

(60) Provisional application No. 60/824,122, filed on Aug. 31, 2006.

(51) Int. Cl.
*G06F 17/00* (2006.01)

(52) U.S. Cl.
USPC ...................................................... 705/7.11

(58) Field of Classification Search
USPC ...................................................... 705/7.11
See application file for complete search history.

(56) References Cited

U.S. PATENT DOCUMENTS

| 5,537,618 A | 7/1996 | Boulton et al. ............... 395/161 |
| 5,568,489 A | 10/1996 | Yien et al. ................... 370/110.1 |
| 5,678,041 A | 10/1997 | Baker et al. .................... 395/609 |
| 5,706,507 A | 1/1998 | Schloss .......................... 395/615 |

(Continued)

FOREIGN PATENT DOCUMENTS

| CA | 2 490 828 | 2/2004 |
| WO | WO 99/59096 | 11/1999 |

(Continued)

OTHER PUBLICATIONS

Vora, P.R., "Designing for the Web: A Survey," design/methods & tools, interjections, pp. 13-30, May-Jun. 1998.

(Continued)

*Primary Examiner* — Thomas Dixon
(74) *Attorney, Agent, or Firm* — Baker Botts L.L.P.

(57) ABSTRACT

According to one embodiment, a computer-implemented method for measuring and reporting business intelligence based on comments collected from web page users using software associated with accessed web pages includes: using a computer system, accessing a plurality of user comments collected from users of one or more web pages using feedback collection software that provides users who access a particular web page a viewable element through which to provide their comments regarding one or more aspects of a business associated with the particular web page; using a computer system, associating each of the plurality of collected user comments with one or more of a plurality of predefined business-related categories; and using a computer system, generating a report identifying, for each of the plurality of predefined business-related categories, one or more quantitative values derived from the collected user comments associated with that business-related category.

28 Claims, 15 Drawing Sheets

(56) References Cited

U.S. PATENT DOCUMENTS

| | | | |
|---|---|---|---|
| 5,727,950 A | 3/1998 | Cook et al. | 434/350 |
| 5,754,939 A | 5/1998 | Herz et al. | 455/4.2 |
| 5,761,683 A | 6/1998 | Logan et al. | 707/513 |
| 5,778,182 A | 7/1998 | Cathey et al. | 395/200.49 |
| 5,804,803 A | 9/1998 | Cragun et al. | 235/375 |
| 5,809,247 A | 9/1998 | Richardson et al. | 395/200.48 |
| 5,862,223 A | 1/1999 | Walker et al. | 380/25 |
| 5,862,260 A | 1/1999 | Rhoads | 382/232 |
| 5,862,325 A | 1/1999 | Reed et al. | 395/200.31 |
| 5,870,744 A | 2/1999 | Sprague | 707/9 |
| 5,872,850 A | 2/1999 | Klein et al. | 380/49 |
| 5,958,008 A | 9/1999 | Pogrebisky et al. | 709/223 |
| 5,973,683 A | 10/1999 | Cragun et al. | 345/327 |
| 5,974,572 A | 10/1999 | Weinberg et al. | 714/47 |
| 5,991,735 A | 11/1999 | Gerace | 705/10 |
| 6,029,171 A | 2/2000 | Smiga et al. | 707/102 |
| 6,035,330 A | 3/2000 | Astiz et al. | 709/208 |
| 6,134,531 A | 10/2000 | Trewitt et al. | 705/10 |
| 6,141,010 A | 10/2000 | Hoyle | 345/356 |
| 6,161,112 A | 12/2000 | Cragun et al. | 707/501 |
| 6,189,029 B1 | 2/2001 | Fuerst | 709/217 |
| 6,236,975 B1 | 5/2001 | Boe et al. | 705/7 |
| 6,243,722 B1 | 6/2001 | Day et al. | 707/512 |
| 6,260,064 B1 | 7/2001 | Kurzrok | 709/224 |
| 6,297,819 B1 | 10/2001 | Furst | 345/419 |
| 6,385,590 B1 | 5/2002 | Levine | 705/10 |
| 6,389,538 B1 | 5/2002 | Gruse et al. | 713/194 |
| 6,393,479 B1 | 5/2002 | Glommen et al. | 709/224 |
| 6,421,724 B1 | 7/2002 | Nickerson et al. | 709/224 |
| 6,434,556 B1 | 8/2002 | Levin et al. | 707/5 |
| 6,449,632 B1 | 9/2002 | David et al. | 709/202 |
| 6,460,036 B1 | 10/2002 | Herz | 707/10 |
| 6,477,504 B1 | 11/2002 | Hamlin et al. | 705/10 |
| 6,480,852 B1 | 11/2002 | Himmel et al. | 707/10 |
| 6,510,427 B1 | 1/2003 | Bossemeyer, Jr. et al. | 707/6 |
| 6,578,014 B1 | 6/2003 | Murcko, Jr. | 705/26 |
| 6,606,581 B1 * | 8/2003 | Nickerson et al. | 702/186 |
| 6,606,657 B1 | 8/2003 | Zilberstein et al. | 709/224 |
| 6,606,659 B1 | 8/2003 | Hegli et al. | 709/225 |
| 6,618,717 B1 | 9/2003 | Karadimitriou et al. | 706/61 |
| 6,631,184 B1 | 10/2003 | Weiner | 379/92.01 |
| 6,681,247 B1 | 1/2004 | Payton | 709/217 |
| 6,748,449 B1 | 6/2004 | Dutta | 709/245 |
| 6,766,481 B2 | 7/2004 | Estep et al. | 714/124 |
| 6,772,139 B1 | 8/2004 | Smith, III | 707/3 |
| 6,792,458 B1 | 9/2004 | Muret et al. | 709/224 |
| 6,819,336 B1 | 11/2004 | Nielsen | 345/711 |
| 6,859,784 B1 | 2/2005 | van Duyne et al. | 705/10 |
| 6,895,437 B1 | 5/2005 | Cowdrey et al. | 709/224 |
| 6,928,392 B2 | 8/2005 | Nickerson et al. | 702/186 |
| 6,938,202 B1 | 8/2005 | Matsubayashi et al. | |
| 7,024,691 B1 | 4/2006 | Herzberg et al. | 726/5 |
| 7,181,696 B2 | 2/2007 | Brock | 715/758 |
| 7,370,285 B1 | 5/2008 | Nickerson et al. | |
| 7,478,121 B1 | 1/2009 | Nickerson et al. | |
| 2001/0047290 A1 | 11/2001 | Petras et al. | 705/10 |
| 2002/0049713 A1 | 4/2002 | Khemlani et al. | 707/1 |
| 2002/0065802 A1 | 5/2002 | Uchiyama | 707/1 |
| 2002/0072955 A1 | 6/2002 | Brock | 705/10 |
| 2002/0087526 A1 | 7/2002 | Rao | 707/3 |
| 2002/0087679 A1 | 7/2002 | Pulley et al. | 709/224 |
| 2002/0087969 A1 | 7/2002 | Brunheroto et al. | 725/13 |
| 2002/0099617 A1 | 7/2002 | Fogelson | 705/26 |
| 2002/0111865 A1 | 8/2002 | Middleton, III et al. | 705/14 |
| 2002/0120727 A1 | 8/2002 | Curley et al. | 709/223 |
| 2003/0009555 A1 | 1/2003 | Nickerson et al. | |
| 2003/0085927 A1 | 5/2003 | Muller | 345/810 |
| 2003/0115023 A1 | 6/2003 | Nickerson et al. | 702/188 |
| 2003/0207238 A1 | 11/2003 | Latzina et al. | 434/118 |
| 2003/0217034 A1 | 11/2003 | Shutt | |
| 2004/0015866 A1 | 1/2004 | Estep et al. | 717/124 |
| 2004/0049571 A1 | 3/2004 | Johnson et al. | 709/224 |
| 2004/0201633 A1 | 10/2004 | Barsness et al. | |
| 2004/0205065 A1 | 10/2004 | Petras et al. | 707/5 |
| 2005/0108020 A1 | 5/2005 | Lehavi | 705/1 |
| 2005/0192854 A1 | 9/2005 | Ebert et al. | 705/7 |
| 2005/0240618 A1 | 10/2005 | Nickerson et al. | 707/102 |
| 2005/0251399 A1 | 11/2005 | Agarwal et al. | 705/1 |
| 2006/0248188 A1 | 11/2006 | Nickerson et al. | 709/224 |
| 2006/0259767 A1 | 11/2006 | Mansz et al. | 713/168 |
| 2006/0265368 A1 | 11/2006 | Nickerson et al. | 707/5 |
| 2008/0033790 A1 | 2/2008 | Nickerson et al. | 705/10 |
| 2008/0059286 A1 | 3/2008 | Nickerson et al. | |
| 2008/0209361 A1 | 8/2008 | Nickerson et al. | |

FOREIGN PATENT DOCUMENTS

| | | |
|---|---|---|
| WO | WO 00/62204 | 10/2000 |
| WO | WO 01/16841 | 3/2001 |
| WO | WO 2004/012044 | 2/2004 |

OTHER PUBLICATIONS

OpinionLab [online], "dna," DIARIST.NET, http://www.diarist.net/active /showthread.php?t=345>, XP002382097, 2 pages, May 8, 2001 Retrieved May 22, 2006.

OpinionLab, "OL™ the leader in automated web feedback solutions," white papers, www.opinionlab.com, pp. 1-70, Printed Jul. 11, 2007.

OpinionLab, "O-Metric Demonstration Tutorial," 6 pages, available prior to Jul. 31, 2001.

OpinionLab, "Best Practices in Collecting Web User Feedback," pp. 1-10, Apr. 2001.

OpinionLab, "OpinionLab's Audit of the Fifty Most Trafficked Websites," pp. 1-4, 2002.

OpinionLab, "Millions of people visit Websites every day. What do they think? It's a simple premise. If you want to know what people think, you have to ask them. (+)" white papers, 23 pages, available prior to Jul. 31, 2001.

OpinionLab, "Brochure re: User Experience Optimization," 1 page, available prior to Jul. 31, 2001.

OpinionLab, "Brochure re: Navigating an O-Metric Report," pp. 1-3, available prior to Jul. 31, 2001.

OpinionLab, "The OnlineOpinion System—Different From Other Feedback Techniques," XP002382096, [online], http://web.archive.org/web/20021010024033/www.opinionlab.com/different.asp>, 2 pages, Jul. 23, 2002 Retrieved May 22, 2006.

BizRate.com, Independent Merchant Evaluation, https://eval.bizrate.com/popchoice.pl?id=19383&rb=1&ip=204.194.97.2&xsum=67748, 1 page; https://eval.bizrate.com/eval_t.pl?id=19383&ip=204.194.97.2&sum=67748&g=102, 5 pages, Printed Jun. 13, 2000.

OpinionLab, "Different Versions of the Online Opinion Data Collection Technique Dramatically Impact the Type of Response a Website Receives," White Paper, 5 pages, © 2001.

Graham, J., "Alternatives to Testing User Experience," [online], Clickz.com, http://www.clickz.com/experts/brand/emkt_strat/print.php/827111, XP002382095, 2 pages, Jul. 31, 2000 Retrieved on May 22, 2006.

Shahabi, C., et al., "Knowledge Discovery from Users Web-Page Navigation," XP010219671, ISBN: 0-8186-7849-6, Research Issues in Data Engineering, 1997 Proceedings, Seventh International Workshop on Birmingham, UK Apr. 7-8, 1997, Los Alamitos, CA, USA, IEEE Computer Society US, pp. 20-29, Apr. 7, 1997.

Watt, J.H., et al., "Using the Internet for Audience and Customer Research," XP010355892, ISBN: 0-7803-579-09-4, Professional Communication Conference 1999, IPCC 99, Communication Jazz: Improvising the New International Communication Culture, Proceedings 1999, IEEE International New Orleans, LA, Piscatawa, NJ, USA, IEEE US, pp. 121-130, Sep. 7-10, 1999.

Katerattanakul, P., et al., "Measuring Information Quality of Web Sites: Development of an Instrument," from the 20th International Conference on Information Systems, 7 pages, Jan. 1999.

Tullis, T.S., "A Method for Evaluating Web Page Design Concepts," from CHI 98 Conference Summary on Human Factors in Computing Systems, ACM, ISBN 1-58113-028-7, 2 pages, Apr. 1998.

Faison, T., "Component-Based Development with Visual C#," Online!, XP002333001, Chapter 8, Creating Front Ends with the WebBrowser Component, pp. 1-4, 27, 33, Feb. 2002.

Etgen, M., et al., "What Does Getting WET (Web Event-Logging Tool) Mean for Web Usability?," Proceedings of the 5th Conference on Human Factors & The Web, XP002332999, Jun. 3, 1999.

Blankenbeckler, D., "Browser Support for Active Content," Chapter 25, XP-002333000, Excerpted from: Morgan, Bryan, "*Visual J++ Unleashed*," Online!, SAMS.NET, Indianapolis, IND., http://web.archive.org/web/20040301061953/http://ww.intel.com/procs/ppro/intro/vrml/mma.wrz, http://docs.rinet.ru/ZhPP/ch25.htm , 11 pages, Retrieved Jun. 21, 2005.

PCT, Notification of Transmittal of International Preliminary Examination Report, PCT/US00/23875, 5 pages, Aug. 22, 2002.

PCT, Notification of Transmittal of the International Search Report or the Declaration, PCT/US 03/23857, 7 pages, Jan. 8, 2004.

PCT, Notification of Transmittal of the International Search Report or the Declaration, PCT/US03/23327, 6 pages, Sep. 7, 2004.

EP, European Search Report—Communication, Application No. EP 05252213.3-1238, 4 pages, Jun. 30, 2005.

EP, Supplemental European Search Report—Communication, Application No. 03771825.1-2205, Patent No. PCT/US0323250, Application No. EP 03771825.1-2205, 3 pages, Jun. 21, 2006.

Nickerson et al., "Measuring a Page-Specific Subjective User Reaction Concerning Each of Multiple Web Pages of a Website," U.S. Appl. No. 10/136,919 (179), May 1, 2002.

Nickerson et al., "Receiving and Reporting Page-Specific User Feedback concerning One or More Particular Web Pages of a Website," U.S. Appl. No. 10/210,609 (181), Jul. 31, 2002.

Nickerson et al., "Receiving and Reporting Page-Specific User Feedback concerning One or More Particular Webe Pages of a Website," U.S. Appl. No. 10/210,256 (182), Jul. 31, 2002.

Nickerson et al., "Soliciting User Feedback regarding One or More Web Pages of a Website without Obscuring Viual Content," U.S. Appl. No. 10/870,024 (192), Jun. 16, 2004.

Nickerson et al., "System and Method for Providing Intelligent Support," U.S. Appl. No. 12/048,136 (262), Mar. 13, 2008.

Canadian Intellectual Property Office, "Office Action," for Application No. 2,489,322, 5 pages, Nov. 14, 2008.

European Patent Office, Decision to Refuse a European Patent Application, Application No. 05252213.3-1238, Nov. 18, 2008, 31 pages.

Nickerson et al., "System and Method for Measuring and Reporting User Reactions to Advertisements on a Web Page," U.S. Appl. No. 11/832,747, Aug. 2, 2007.

Nickerson et al., "Receiving and Reporting Page-Specific User Feedback Concerning One or More Particular Web Pages of a Website," U.S. Appl. No. 12/115,442, May 5, 2008.

European Search Report dated Nov. 7, 2007; Application No. 07016965.1-1238; 5 pages.

U.S. Patent and Trademark Office; "Office Action," for U.S. Appl. No. 11/847,676; 067543.0236; 7 pages, Jan. 29, 2010.

* cited by examiner

Comment Card

Page Comments

Choose a topic for your comments:

[Please choose one ▼]

Please enter your comments about this page.

[text area with scrollbar]

1000 characters remaining.

Account related questions? Click here.

Email Address: (not required)

[            ]

Page Ratings

|          | -- | - |   | + | ++ |
|----------|----|----|----|----|----|
| Content  | ○  | ○ | ○ | ○ | ○  |
| Design   | ○  | ○ | ○ | ○ | ○  |
| Usability| ○  | ○ | ○ | ○ | ○  |
| Overall  | ○  | ○ | ○ | ○ | ○  |

Optional Questions:

1. How likely are you to share information about our services with your colleagues?

-- ○  - ○   ○  + ○  ++ ○

[Submit]

Privacy Policy | About this system

| Column A | Column B |
|---|---|
| Non-English/Foreign | Other |
| Non-specific | Gibberish, non- |
| Personal view | Non-specific praise |
| Obscenity, no issue | Declarative |
| HR (careers, | Other |
| Product Policies | Store appearance |
| Other | Investments |
| Catalog, send me | Frequent |
| Business | Special |
| Improvement/change | Other |
| Will you fly to ...? | Praise |
| Request for | Price |
| Availability of an | Recall information |
| Named and dislike | Not Named but |
| Other | Named and like |
| Comment about | Comment about |
| Questions about tax | Questions about |
| Other | Why no total before I |
| General criticism | Special requests |
| Difficulty | General praise |
| No contact | No one has returned |
| Please contact me | Please do not |
| Warranty-literature | Will you build store |
| Gift card | Warranty product |
| Status of | Return item/cancel |
| Payment method | Ship method |
| Other | Order/Account |
| General praise | General criticism |
| Email issues (not | Other |
| No contact | Difficulty |
| Other | Technical Support |
| Cannot checkout | Issue w/ payment |
| Other | Missing item(s) |
| Online Registry | Online account |
| Online Profile-does | Online Profile-cannot |
| Inconsistency | Other |
| Praise | Change to personal |
| Page = inappropriate | Outdated/incorrect/ |
| Page not available | Suggested |
| Other | Spelling or grammer |
| HELP does not work | Repeatedly must |
| Userid does not | PW reset does not |
| Forgot/cannot | Password does not |
| Cannot login | Cannot logout |
| Cannot find item | Other |
| Speed issue | Procedure/process |
| Installation issue | Other |
| Download issue | Print issue |
| Add a language | Browser/Operating |
| Praise | Technology (pdf vs. |
| Load speed | Page issue (but not |
| Providing personal | Link issue |
| Popup/Banner's ads | Trust certificate |
| Error Page | Other |
| Misdirected to | Site/function not |
| Ease of navigation | Back to previous |

| Code | Category |
|---|---|
| 1.0 | Website-Usability |
| 1.1 | Ease of navigation |
| 1.2 | Back to previous page |
| 1.3 | Misdirected to page(s) |
| 1.4 | Site/function not available-down |
| 1.5 | Error Page |
| 1.99 | Other |
| 2.0 | Website-Design |
| 2.1 | Popup/Banner ads |
| 2.2 | Trust certificate issues or why no https: |
| 2.3 | Providing personal information |
| 2.4 | Link Issue |
| 2.5 | Load speed |
| 2.6 | Page issue (but not print) |
| 2.7 | Praise |
| 2.8 | Technology (pdf vs. flash, RSS) |
| 2.9 | Add a language |
| 2.10 | Browser/Operating System |
| 2.11 | Download issue |
| 2.12 | Print issue |
| 2.13 | Installation issue |
| 2.99 | Other |
| 3.0 | Website-Search |
| 3.1 | Speed issue |
| 3.2 | Procedure/process issue |
| 3.3 | Cannot find item |
| 3.99 | Other |
| 4.0 | Website-Login/Logout/Password |
| 4.1 | Cannot login |
| 4.2 | Cannot logout |
| 4.3 | Forgot/cannot retrieve PW |
| 4.4 | Password does not work |
| 4.5 | Userid does not work |
| 4.6 | PW reset does not work |
| 4.7 | HELP does not work |
| 4.8 | Repeatedly must login |
| 4.99 | Other |
| 5.0 | Website-Content |
| 5.1 | Spelling or grammar error |
| 5.2 | Page not available |
| 5.3 | Suggested improvement/change |
| 5.4 | Page = inappropriate content |
| 5.5 | Outdated/incorrect/missing information |
| 5.6 | Praise |
| 5.7 | Change to personal home page |
| 5.8 | Inconsistency between pages (MOVED fm 2.7) |
| 5.99 | Other |
| 6.0 | Website-Online Profile |
| 6.1 | Online Profile-does not work |
| 6.2 | Online Profile-cannot modify |
| 6.3 | Online Registry |
| 6.4 | Online account |
| 6.99 | Other |
| 7.0 | Website-Checkout |
| 7.1 | Missing item(s) |
| 7.2 | Cannot checkout |
| 7.3 | Issue w/ payment method |
| 7.99 | Other |
| 8.0 | Website-Tech Support |
| 8.1 | Technical support issues |
| 8.2 | No contact number/email |
| 8.3 | Difficulty communicating with technician |
| 8.4 | Email issues (not lack of contact) |
| 8.99 | Other |
| 9.0 | Website-General |
| 9.1 | General praise |
| 9.2 | General criticism |
| 9.99 | Other |
| 10.0 | Customer Service |
| 10.1 | Order/Account (including backorder) |
| 10.2 | Payment method |
| 10.3 | Ship method |
| 10.4 | Status of refund/credit |
| 10.5 | Return item/cancel order |
| 10.6 | Gift card |
| 10.7 | Warranty-product service |
| 10.8 | Warranty-literature |
| 10.9 | Will you build store in X? |
| 10.10 | Please contact me (mailing list, email) |
| 10.11 | Please do not contact me (mailing list) |
| 10.12 | No contact number/email (not tech support) |
| 10.13 | No one has returned my call/email |
| 10.14 | Difficulty communicating with individual |
| 10.15 | General praise |
| 10.16 | General criticism |
| 10.17 | Special Requests |
| 10.99 | Other |
| 11.0 | Sales |
| 11.1 | Why no total before I give my credit card #? |
| 11.2 | Questions about tax amount |
| 11.3 | Questions about shipping/handling amount |
| 11.4 | Comment about sales person |
| 11.5 | Comment about dealer |
| 11.99 | Other |
| 12.0 | Product |
| 12.1 | Named and like |
| 12.2 | Named and dislike |
| 12.3 | Not named but provides view |
| 12.4 | Availability of an item |
| 12.5 | Recall information |
| 12.6 | Request for assistance in using |
| 12.7 | Price |
| 12.8 | Will you fly to....? |
| 12.9 | Praise |
| 12.10 | Improvement/change |
| 12.99 | Other |
| 13.0 | Marketing |
| 13.1 | Business opportunity |
| 13.2 | Special offers/promotions |
| 13.3 | Catalog, send me |
| 13.4 | Frequent flyer/customer loyalty programs |
| 13.99 | Other |
| 14.0 | Corporate Operations |
| 14.1 | Investments |
| 14.2 | Product policies |
| 14.3 | Store appearance |
| 14.4 | HR (careers, applications) |
| 14.99 | Other |
| 15.0 | Not Listed Elsewhere Above |
| 15.1 | Obscenity, no issue |
| 15.2 | Declarative statement, no issue |
| 15.3 | Personal view (article, book, author) |
| 15.4 | Non specific praise (not website) |
| 15.5 | Non specific criticism (not website) |
| 15.6 | Gibberish, non-sensical |
| 15.7 | Non English/Foreign Language |
| 15.99 | Other |

400

| | O-Trend: Site Comments | |
|---|---|---|
| | June 2006 | Description<br>Below is a list of comments submitted to your site during the report timeframe. |
| | Full Comment Listing (Excel format) | Suggestion<br>Use this table in conjuction with Page Metrics Summary to gain a fuller understanding of visitor reaction to your website. |

| URL | Date | Rating | Website-Design (320) ▼ | Comment |
|---|---|---|---|---|
| 🎲 | 2006-06-29<br>23:51:13 CST | 1 | Website-Design | All my friends in here lost! My last time using this is not longer than one month, and this morning I download the new version and have a try, and the empty panel did shock me! Where is my friends?? Looking for your reply!! |
| 🎲 | 2006-06-29<br>16:47:31 CST | 1 | Website-Design | Whenever I run my normal feeds, ie uses up a TON of memory. Right now, it?s been running for about an hour and it?s over 284000KB in memory. That?s ridiculous! I?m going to find a different RSS aggregator that uses less memory, because ends up hosing my machine. I?m running a laptop with 1 Gig of RAM, so it?s not my machine. |
| 🎲 | 2006-06-28<br>17:04:48 CST | 1 | Website-Design | I hate my homepage and can?t find a way to reset it to the default. What?s the point? There?s got to be more to it than mushing together some gadgets. Where?s the integration? Where?s the part where the whole is more than the sum of the parts? Where?s the part where these individual parts work together to enable something new? The same old portal stuff with a customizable layout isn?t enough. |
| 🎲 | 2006-06-27<br>12:07:40 CST | 1 | Website-Design | I did play with moving the parts for a while. I ended up having all the parts on top of each other. |
| 🎲 | 2006-06-26<br>20:43:13 CST | 1 | Website-Design | Wow, what a bad experience I just had. About 2 months ago I customized my home page. Recently the settings were discarded (because I cleaned out my cookies, you changed something on your side, who the heck knows?). I looked for a way to login |

Page [ 5 ▼ ] of 19

*FIG. 7*

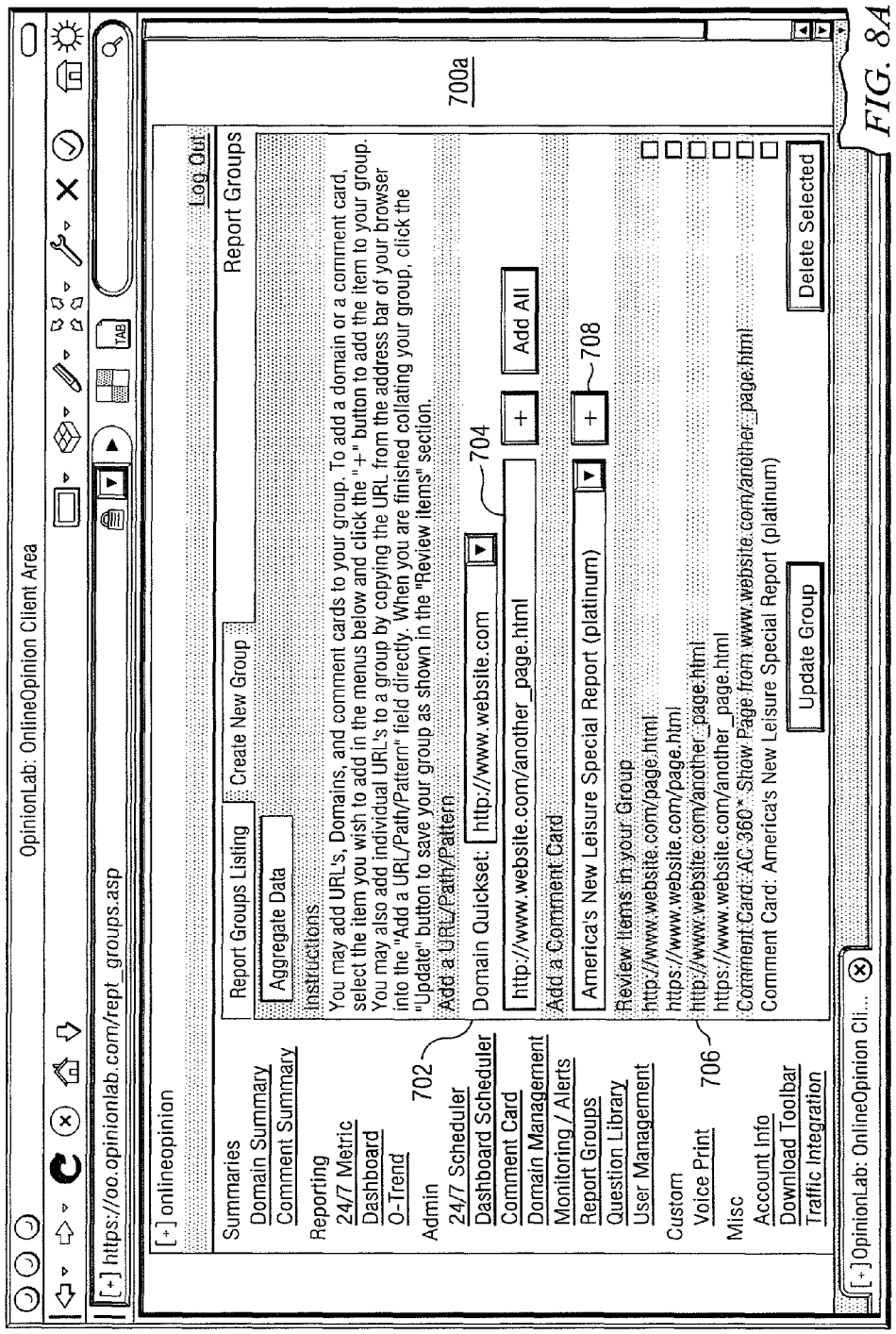

COMPUTER-IMPLEMENTED SYSTEM AND METHOD FOR MEASURING AND REPORTING BUSINESS INTELLIGENCE BASED ON COMMENTS COLLECTED FROM WEB PAGE USERS USING SOFTWARE ASSOCIATED WITH ACCESSED WEB PAGES

RELATED APPLICATION

This application is a continuation of U.S. patent application Ser. No. 11/847,676 filed Aug. 30, 2007 now U.S. Pat. No. 7,809,602 by Rand B. Nickerson and Mark A. Treschl and entitled "Computer Implemented System and Method for Measuring and Reporting Business Intelligence Based on Comments Collected From Web Page Users Using Software Associated With Accessed Web Pages" which claims priority under 35 U.S.C. §119 of provisional application No. 60/824,122 filed Aug. 31, 2006.

TECHNICAL FIELD OF THE INVENTION

This invention relates generally to computer-implemented feedback collection and reporting and more particularly to a computer-implemented system and method for measuring and reporting business intelligence based on comments collected from web page users using software associated with accessed web pages.

BACKGROUND OF THE INVENTION

Customer feedback data is among the richest sources of intelligence available to businesses and the Internet is one of the most underutilized opportunities to access it. Many businesses provide websites for customers, potential customers, partners, and the general public to use to learn about the businesses and their products and services. Some websites provide mechanisms to allow users to provide feedback to the business about the website, the products and services of the business, or the business itself. In some instances, the volume of this feedback data may be substantial and the subject matter may be varied. Collection, analysis, and management of this feedback data is typically either ineffective, inefficient, or both. In some situations, valuable feedback data may be discarded because it does not fit within an anticipated scope. In other situations, valuable feedback data may be underutilized because it is only available for a single functional group within a business, because it is only used for purposes that are limited relative to the nature of the feedback data, or because any analysis of the feedback data is not performed at a rate that is sufficient for the time-sensitive nature of the feedback data.

SUMMARY OF THE INVENTION

Particular embodiments of the present invention may reduce or eliminate problems and disadvantages associated with previous techniques for measuring and reporting customer feedback.

In one embodiment, a computer-implemented method for measuring and reporting business intelligence based on comments collected from web page users using software associated with accessed web pages includes: using a computer system, accessing a plurality of user comments collected from users of one or more web pages using feedback collection software that provides users who access a particular web page a viewable element through which to provide their comments regarding one or more aspects of a business associated with the particular web page; using a computer system, associating each of the plurality of collected user comments with one or more of a plurality of predefined business-related categories; and using a computer system, generating a report identifying, for each of the plurality of predefined business-related categories, one or more quantitative values derived from the collected user comments associated with that business-related category.

In another embodiment, a system for measuring and reporting business intelligence pertinent to a business includes software encoded in a computer readable medium. When the software is executed using one or more processors, the software is operable to access a plurality of user comments collected from users of one or more web pages using feedback collection software that provides users who access a particular web page a viewable element through which to provide their comments regarding one or more aspects of a business associated with the particular web page; associate each of the plurality of collected user comments with one or more of a plurality of predefined business-related categories; and generate a report identifying, for each of the plurality of predefined business-related categories, one or more quantitative values derived from the collected user comments associated with that business-related category.

In another embodiment, an electronically generated business intelligence report includes a plurality of category indicators each identifying one of a plurality of predefined business-related categories; and a plurality of quantitative indicators identifying, for each of the plurality of predefined business-related categories, one or more quantitative values derived from user comments collected from users of one or more web pages using feedback collection software that provides users who access a particular web page a viewable element through which to provide their comments regarding one or more aspects of a business associated with the particular web page.

Certain embodiments of the present invention may provide one or more technical advantages related to measuring and reporting business intelligence. For example, certain embodiments may provide for more efficient and timely assessment of the impact of certain business activities based on user feedback. Certain embodiments may make available substantially real-time user feedback regarding one or more aspects of a business and its operation. Particular embodiments may provide an organized metric for assessing the health of a business and its operation based on user feedback. Certain embodiments may provide substantially real-time reporting, diagnostic tools, and automated alerts. Certain embodiments may provide tools to categorize and/or assess a variety of collected user feedback that may extend beyond the scope of feedback that was initially expected. Certain embodiments may provide all, some, or none of these technical advantages. Certain embodiments may provide one or more other technical advantages, one or more of which may be readily apparent to those skilled in the art from the figures, descriptions, and claims included herein.

BRIEF DESCRIPTION OF THE DRAWINGS

FIG. 2 illustrates an example element for receiving user feedback;

FIG. 3 illustrates an example report of business-related user feedback;

FIG. 5 illustrates an example categorization scheme;
FIG. 7 illustrates an example report of user feedback;
FIGS. 8A-8B illustrate example selection tools.

DESCRIPTION OF EXAMPLE EMBODIMENTS

Feedback from customers, partners, and the general public can be collected through the use of various tools and techniques. For example, feedback may be collected over the phone, such as through a call center or help desk. As another example, feedback may be collected in person, such as in focus groups or live marketing surveys. As another example, feedback may be written down and submitted through the mail or otherwise, such as in the case of a mail-in comment card. As another example, feedback may be collected electronically, such as through the use of a computer, PDA, interactive television system, etc. In certain embodiments, feedback may be collected through the use of a feedback mechanism associated with a particular web site, web page, or Internet distributed advertisement. In certain embodiments, feedback may be collected through the use of a feedback mechanism associated with a particular television program, movie, or video advertisement. In the description provided, many example embodiments utilize electronically collected feedback, and more particularly feedback collected through a web page mechanism, as an example; however, alternative embodiments of the present invention may utilize or operate with feedback collected using alternative tools and techniques, alone or in combination with feedback electronically collected through a web page feedback mechanism. The present invention is intended to encompass these alternative embodiments.

Figure 1:
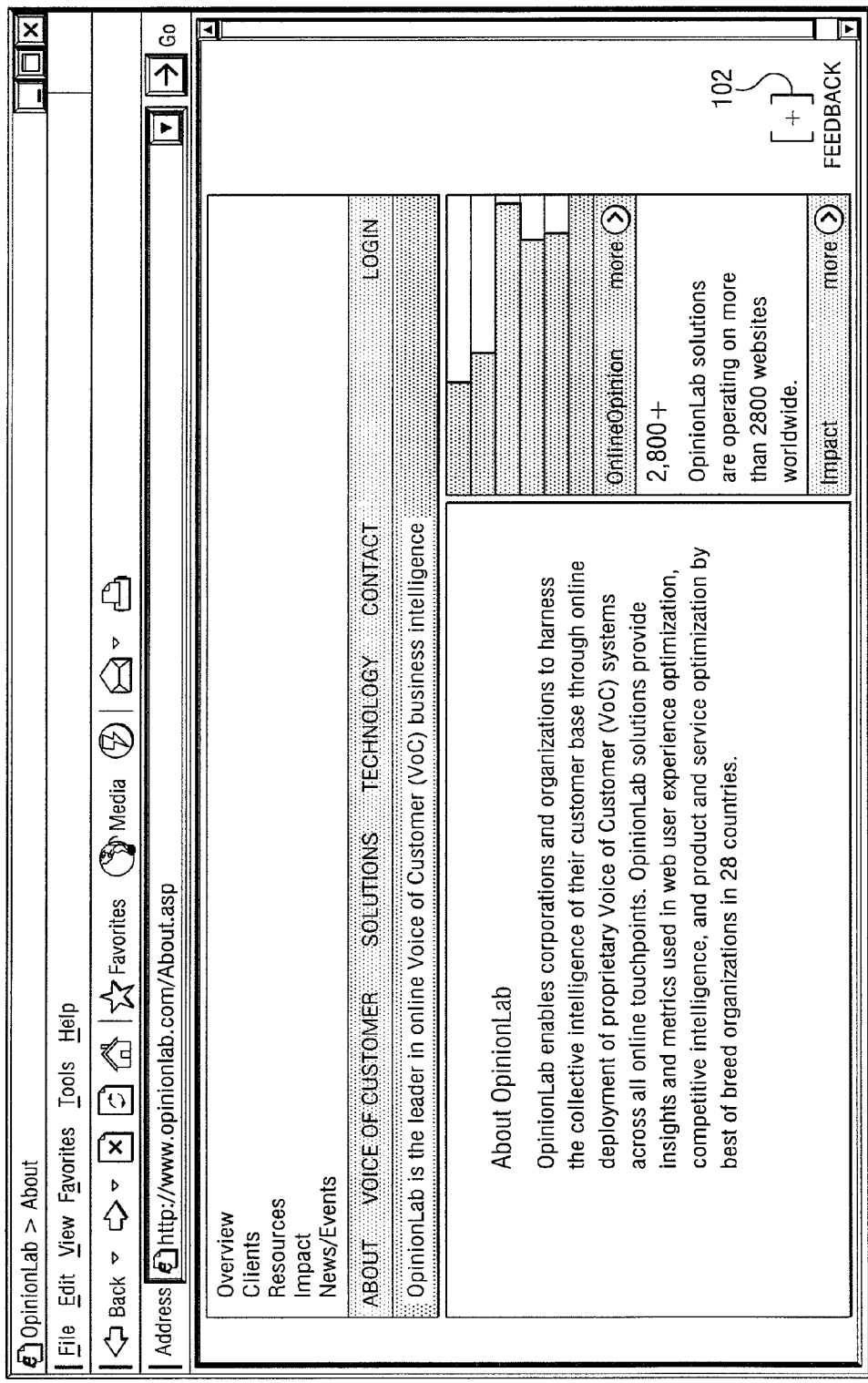
FIG. 1 illustrates an example web page displaying an example element for soliciting user feedback.

An example web page feedback mechanism utilizes a first element for soliciting user feedback and a second element for receiving user feedback. FIG. 1 illustrates an example web page 100 displaying an example element 102 for soliciting user feedback. In the example shown, element 102 is an icon positioned in the lower right corner of web page 100. FIG. 2 illustrates an example element 200 for receiving user feedback. In the example shown, element 200 is a form with several multi-level rating scales 202, a topic selector 204, a comment box 206 that may be utilized to provide open-ended comments, and a feedback tool for collecting responses to an explicit question 208. In certain embodiments, a feedback mechanism may include tools to collect demographic information for a user providing feedback. In certain embodiments, a feedback mechanism may include tools to collect web page information, such as the web page title, URL, load time, and load date. In certain embodiments, a feedback mechanism may include tools to collect the time and/or date that the feedback is provided. In certain embodiments, a feedback mechanism may include tools to collect, contextual information for a user, such as the user's IP address, hostname, username, password, network connection, time zone, operating system, web browser, screen resolution, plug-ins, referring page, browser history, or any other appropriate aspects of the user's environment.

In certain embodiments, element 200 may be presented in response to a user selecting element 102. In certain embodiments, element 200 may open in a separate window from web page 100, in the same window as web page 100 replacing web page 100, or in a frame within the same window as web page 100. In certain embodiments, element 200 may be designed or intended to collect web-page specific user feedback, product or service specific user feedback, or company specific user feedback.

In certain embodiments, although element 200 may be designed or intended to collect specific types of user feedback, additional types of feedback may also be collected. For example, element 200 may be designed or intended to collect feedback related to a particular web page, but may be used by web page users to provide feedback unrelated to the particular web page, such as feedback on one or more customer service or product related issues. As another example, element 200 may be designed or intended to collect feedback related to a particular product or service, but may be used by web page users to provide feedback related to general corporate operations or recent news about the business.

In embodiments of element 200 that include comment box 206 or other tools for receiving open-ended user feedback, element 200 may collect user feedback related to various aspects of a business and its operation. This user feedback may be broadly referred to as business intelligence. Such business intelligence may be related to any aspect of a business and its operation. For example, business intelligence may include e-commerce information (including various aspects of the website(s) of a business), customer service, sales, products and services, marketing, corporate operations, etc.

In certain embodiments, user feedback related to business intelligence may be categorized by the user that provides the feedback through the use of one or more tools available at the time the feedback is provided. For example, while a user is viewing element 200 displayed by a computer system, the user may identify a category for a particular user comment, using topic selector 204. As an alternative, in certain embodiments, user comments may be categorized by one or more analysts who may read user comments and then associate each user comment with one or more business-related categories or subcategories. In certain embodiments, user comments may be categorized by associating each user comment with one or more categories selected from a predefined group of categories. For example, an analyst may view a comment, either printed on paper or displayed by a computer, and then using a computer system the analyst may submit information into a database to associate the user comment with one or more predefined business-related categories. As another alternative, all or a portion of the user comments may be automatically categorized by one or more software applications executed on a computer system, in response to the user comments being accessed. For example, a software application executed on a computer system may utilize keyword associations to categorize user comments. In addition, or as an alternative, a software application executed on a computer system may utilize inductive learning algorithms, Bayesian filters, or other appropriate logic to categorize user comments.

In certain embodiments, user comments may be categorized at least in part based on the user's demographic information, contextual information, or other information relating to the user or the user's methods of providing feedback. For example, user comments may be categorized manually or automatically based on the user's IP address, hostname, username, password, network connection, time zone, operating system, web browser, screen resolution, plug-ins, referring page, and/or browser history. In certain embodiments, this manual or automatic categorization based on demographic information or contextual information may be used as an alternative to, or in addition to, categorization based on the user's comments or other feedback.

Example business-related categories may include customer service, sales, product, marketing, corporate operations and categories related to e-commerce (including various aspects of the website(s) of a business). In certain embodiments, one or more of these business-related categories may include one or more sub-categories. For example a website category may include several sub-categories, such as general, usability, content, design, login/logout/password, online profile, search, checkout, technical support, etc.

In certain embodiments, a subjective assessment of each user comment may be provided and ratings may be assigned to each user comment. In certain embodiments, user comments may be subjectively assessed by one or more analysts who may read user comments and then assign one or more ratings to each user comment. For example, an analyst may view a comment, either printed on paper or displayed by a computer; analyze the comment to provide a subjective assessment; and then using a computer system the analyst may submit information into a database to assign a rating to the user comment. As another alternative, all or a portion of the user comments may be automatically assessed by one or more software applications executed on a computer system. For example, a software application executed on a computer system may utilize keyword associations to assess user comments. In addition, or as an alternative, a software application executed on a computer system may utilize inductive learning algorithms, Bayesian filters, or other appropriate logic to categorize user comments.

Example ratings may include positive, negative, and neutral ratings. Example ratings may range from positive integers to negative integers, with zero being a neutral rating (e.g., from −3 to +3). Example ratings may be only positive integers, with a specified integer being associated with a neutral rating, integers above that specified integer being associated with a positive rating, and integers below that specified integer being associated with a negative rating (e.g., from 1 to 5). Example ratings may be color-coded, with certain colors being associated with certain ratings. For example, green may be associated with positive ratings, red may be associated with negative ratings, and black or yellow may be associated with neutral ratings.

In certain embodiments, a report of user feedback may be generated. The report may include, for example, category indicators each identifying one of a plurality of business-related categories, and a plurality of quantitative indicators identifying, for each of the plurality of business-related categories, one or more quantitative values derived from collected user comments collected. For example, a quantitative indicator may identify the quantity of collected user comments associated with a particular business-related category. As another example, a quantitative indicator may identify the quantity of collected user comments assigned to a particular rating. As another example, a quantitative indicator may identify an average rating for multiple collected user comments associated with a particular business-related category. As another example, a quantitative indicator may identify a difference between a current average rating and a previous average rating. As another example, a quantitative indicator may identify a rate of change in the average rating for collected user comments associated with a particular category.

In certain embodiments, the report may be based on user feedback received within a specified period of time, such as user feedback received in the last day, week, month, quarter, etc. In certain embodiments, the report may be based on a certain number of user comments. For example, the report may indicate how many of the last one-thousand comments are associated with each business-related category.

FIG. 3 illustrates an example report 300 of business-related user feedback. In the embodiment shown, report 300 is a bar graph that identifies over one-hundred example business-related categories 302 and indicates for each particular business-related category, a quantity of user comments associated with the particular business-related category based on the sized of the bar associated with each identified category. In certain embodiments, report 300 may be color-coded. For example, each bar shown in report 300 may be color-coded, such that each color indicates a particular rating assigned to one or more user comments. In a particular embodiment, each bar may include up to three colors, with a red portion indicating the quantity of negative user comments in a particular category, a green portion indicating the quantity of positive user comments in the particular category, and a black or yellow portion indicating the quantity of neutral user comments in the particular category.

In a particular embodiment, report 300 may be presented as a mirror-image bar graph, such that the graph includes a first half and a second half, the first half being separated from the second half by an axis of the graph and the first half being a mirror-image of the second half. In embodiments utilizing a mirror-image bar graph, the mirror-image may be utilized to magnify the size of each bar presented on the graph.

In a particular embodiment, report 300 may be presented as a split-image bar graph, such that the graph includes a first half and a second half, the first half being separated from the second half by an axis of the graph and the first half providing a first set of information and the second half providing a second set of information. In certain embodiments, by including two sets of information on the same graph, it may communicate trend information, benchmarks, or comparisons. For example, the first set of information may be current or recent information, such as information for the most recent day, month, quarter, or year; and the second set of information may be historical or cumulative information, such as information for the previous day, month, quarter, or year. As another example, the first set of information may be information related to a particular business and the second set of information may be information related to a different business, multiple businesses, or an industry. As yet another example, the first set of information may reflect feedback collected through a first method or technique; and the second set of information may reflect feedback collected through a second method or technique.

In certain embodiments, report 300 may be electronically generated and may be presented in an electronic format and displayed, for example, on a computer monitor or other form of electronic display. In a particular embodiment, report 300 may be updated in substantially real time, such that the information displayed in report 300 changes over time as additional user feedback is received. In these embodiments, the rate at which report 300 is updated may depend, among other things, upon the rate at which user feedback is categorized and assessed. In certain embodiments, report 300 may be used to provide an organized metric for assessing the health of a business and its operation across numerous business-related categories. In certain embodiments, report 300 may be used to provide a substantially real-time indication of customer, partner, and/or general public responses to one or more actions taken by a business. For example, report 300 may indicate customer responses to a new product introduced by a business. As another example, report 300 may indicate a general public response to actions taken by a business that have been discussed recently by one or more news media.

In certain embodiments, one or more software applications executed on a computer system may be utilized to generate report 300. In these embodiments, the one or more software applications executed on a computer system may further be utilized to generate automated alerts based on one or more criteria associated with the categorized user feedback. For example, if the quantity of user comments exceeds a certain limit within a specified period of time, an automated alert may be generated. In an alternative embodiment, if a certain number of user comments having a negative rating are received in a specified period of time, then an automated alert may be generated. Such an automated alert may include, for example, an email or a text message sent to a person within the business designated as having responsibility for a particular category.

Figure 4:
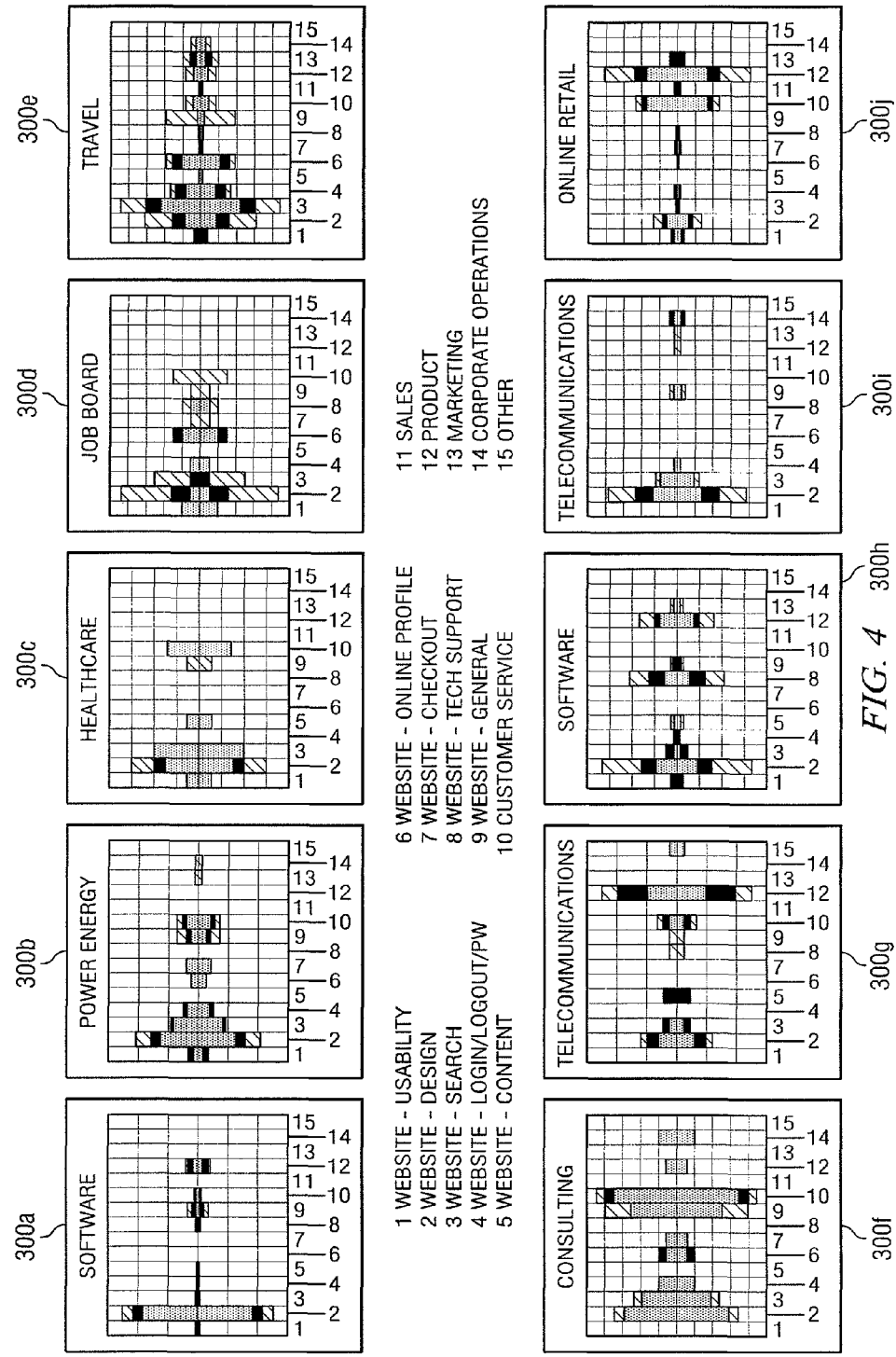
FIG. 4 illustrates example reports that may be generated for each of a plurality of industries.

FIG. 4 illustrates example reports 300 that may be generated for each of a plurality of industries. In the embodiments shown, each report 300 includes fifteen categories of user feedback, including nine website-related categories, a customer service category, a sales category, a product category, a marketing category, a corporate operations category, and an other category. In certain embodiments, a comment categorization hierarchy or indexing scheme may be developed for use across numerous industries and/or across numerous businesses within a single industry. Through the use of such an indexing scheme, user feedback collected with respect to multiple businesses may be utilized to develop an industry benchmark for user feedback. In certain embodiments, such a benchmark may be utilized to assist in assessing the health of a business within a particular industry. In certain embodiments, a standard indexing scheme may be utilized across multiple businesses, with each business utilizing the same indexing scheme alone or together with business specific categories. Alternatively, within a standardized indexing scheme, each business may utilize business-specific sub-categories. For example, in a product category each business may identify one or more sub-categories associated with specific products produced, marketed, and/or sold by that business.

FIG. 5 illustrates an example categorization scheme 400 that may be utilized to categorize user feedback for a business, for multiple businesses within an industry, or for multiple businesses across multiple industries.

Figure 6A:
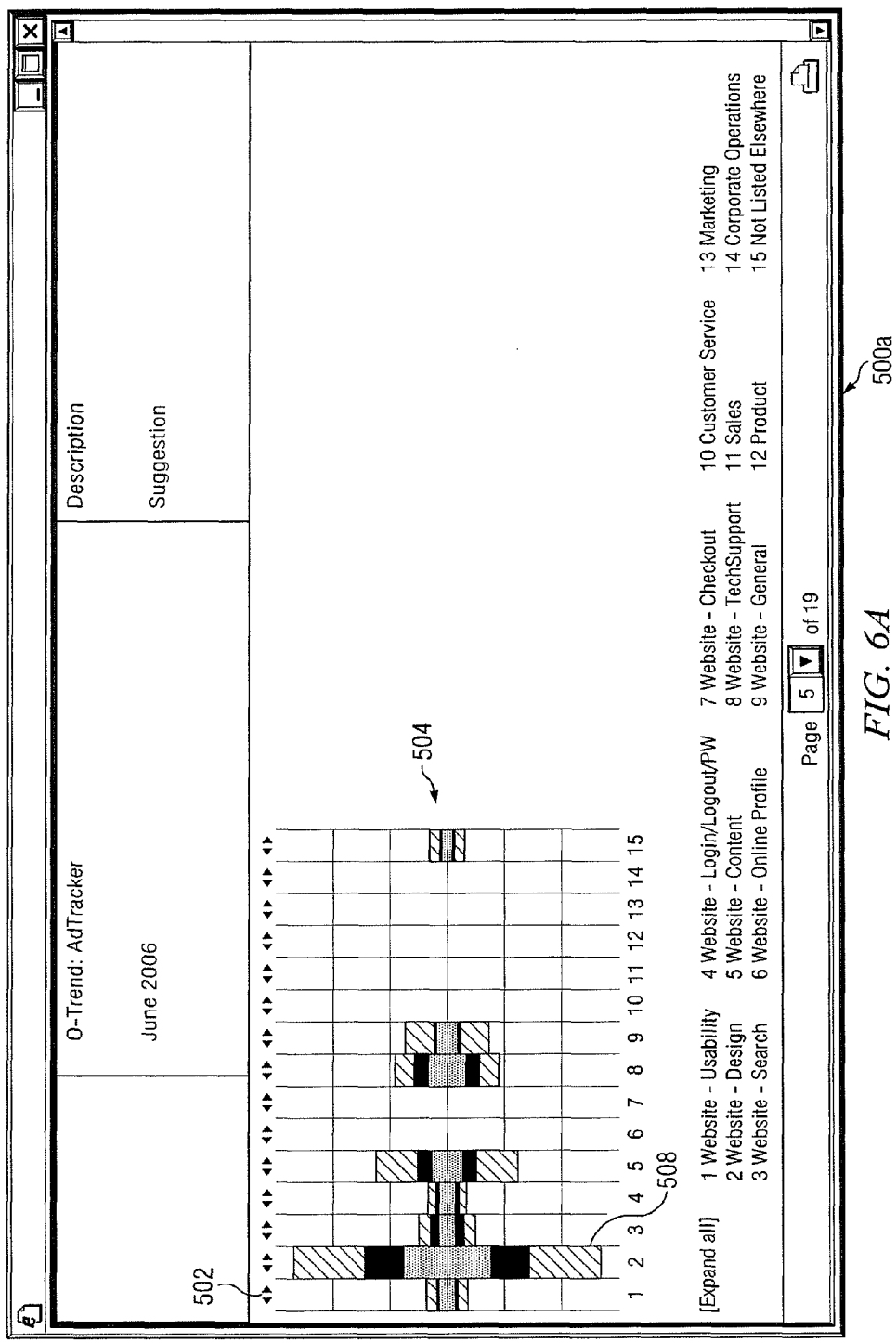
FIGS. 6A-6C illustrate an example interactive report.
Figure 6B:
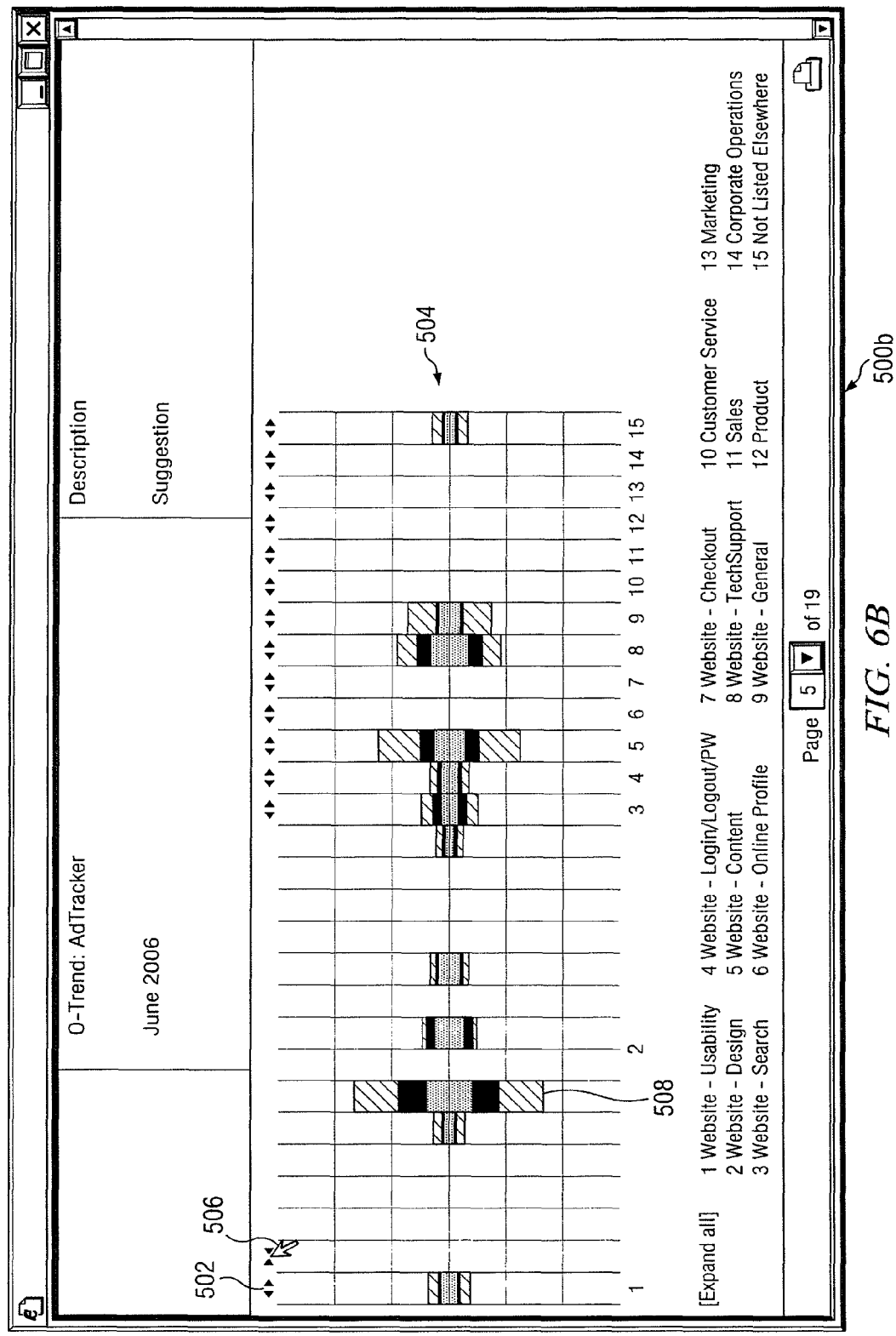
Figure 6C:
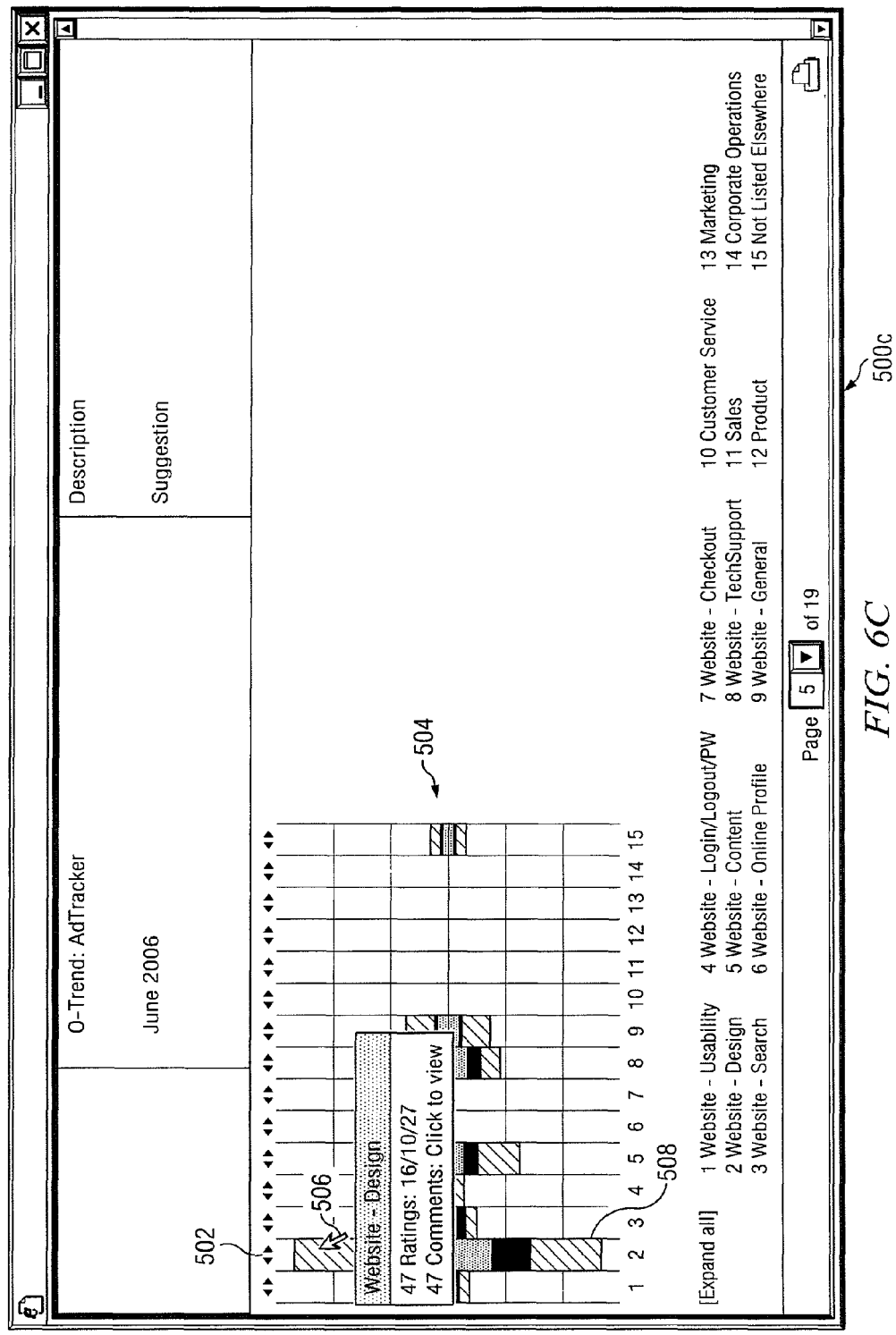

FIGS. 6A-6C illustrate an example interactive report 500 for displaying business-related user feedback. In the embodiment shown, report 500 includes a bar graph and identifies fifteen categories of user feedback. In certain embodiments, software associated with report 500 may allow a user to interact with report 500 to manipulate the display of information provided. For example, if report 500 is presented on a computer screen, a user may use a mouse or other device to interact with report 500. In a particular embodiment, if a user clicks on one of the arrows 502 at the top of bar graph 504 shown in report 500a, then bar graph 504 may expand to present more detailed information including information for sub-categories within a particular category, as shown in report 500b. In certain embodiments, a user may drag a cursor 506 over a portion of bar graph 504 and obtain additional information regarding the data presented, such as is shown on report 500c.

In certain embodiments, a user may interact with report 500 to generate a list of comments associated with one or more categories. For example, by clicking on one of the bars 508 of bar graph 504 presented in report 500c, a user may access a comment listing, such as comment listing 600 shown in FIG. 7. Comment listing 600 includes specific user comments associated with a particular category or subcategory. In certain embodiments, comment listing 600 may include additional information related to particular comments. For example, comment listing 600 may identify the time and date that a particular comment was received, the rating assigned to a particular comment, the source of the particular comment (such as the URL of the web page that the web page user was visiting at, or just prior to, the time that the comment was submitted), etc.

In certain embodiments, software for use in reporting user feedback may utilize features described in, for example, one or more of U.S. Pat. No. 6,421,724; U.S. Pat. No. 6,606,581; and U.S. Pat. No. 6,928,392. In certain embodiments, one or more of report 300, report 500, and comment listing 600 may be customizable using one or more filters, sorting tools, etc.

Figure 8B:
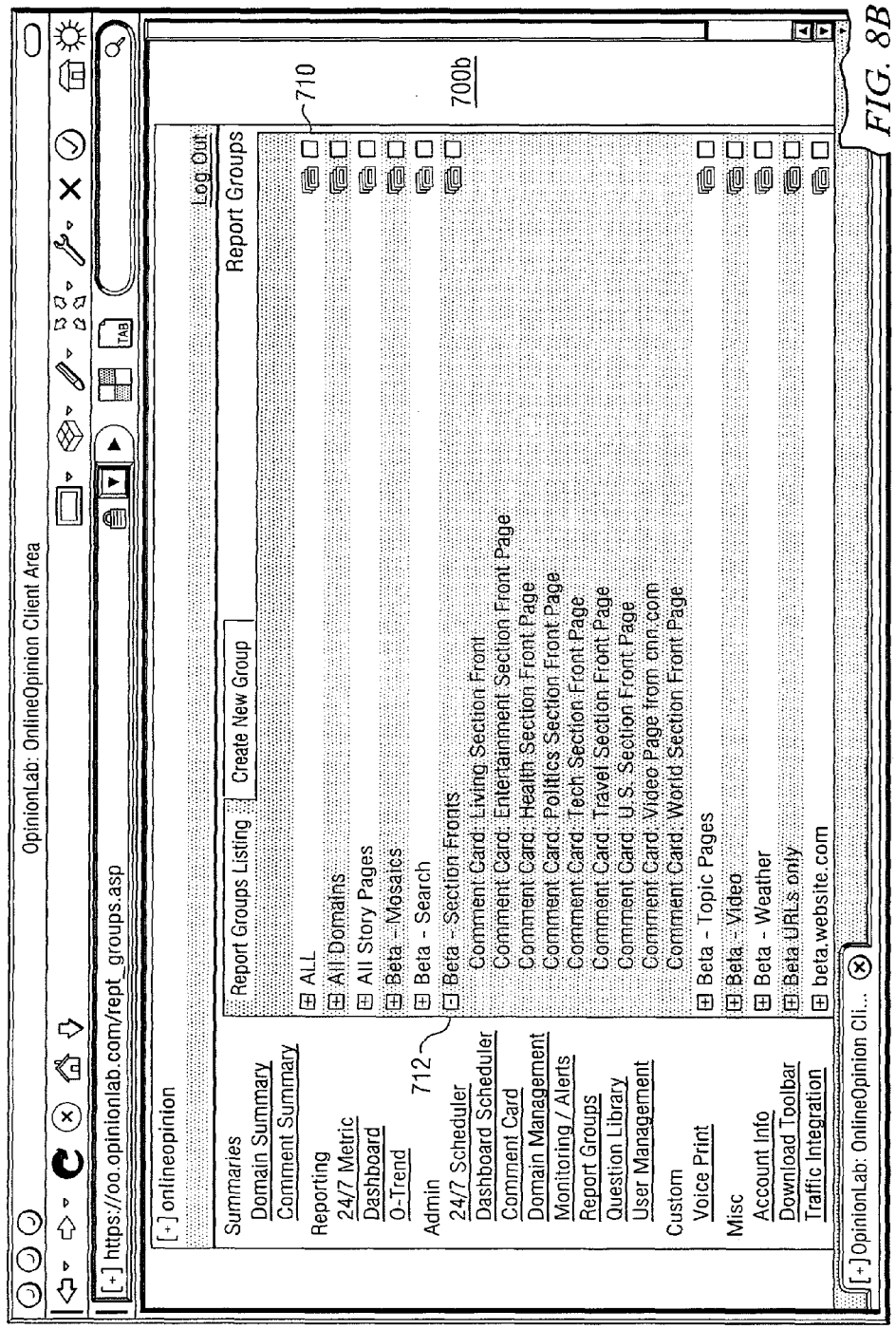

FIGS. 8A-8B illustrate example selection tools 700 that may be used to select portions of user feedback and/or to generate customized reports. As shown in FIG. 8A, in certain embodiments, feedback may be selected based on a particular domain or website. For example, feedback may be selected using domain selector 702, which may utilize a drop-down menu or other appropriate selection technique. Additionally or alternatively, in certain embodiments, feedback may be selected for one or more specific web pages. In a particular embodiment, particular web pages may be selected from a list or by specifying the URL for the particular web page(s). For example, a URL may be specified in new page tool 704 and particular pages may be selected from group selector tool 706. As shown, in certain embodiments, group selector tool 706 may utilize radio buttons or other appropriate selection methods or techniques. In certain embodiments, feedback may also be selected based on a particular comment card or other user feedback technique or tool. For example, a particular comment card may be added using comment card tool 708 and then selected using group selector tool 706. Through the use of these tools and techniques, new collections of user feedback may be defined. In certain embodiments, the criteria for these new collections may be stored for future use or selection.

As shown in FIG. 8B, in certain embodiments, portions of user feedback may be selected by category and/or by choosing previously established filtering criteria or groups. For example, categories may be defined by page topics, by page functions, or by URL paths. In certain embodiments, multiple categories and/or subcategories of feedback may be selected for use in generating a customized report. As shown in FIG. 8B, individual categories may be selected from a list using selection tool 710, which may utilize a radio button or other appropriate selection technique. In particular embodiments, information about particular categories may be hidden or displayed depending upon selected settings. For example, by selecting expansion tool 712, particular criteria for a group may be displayed.

Figure 9A:
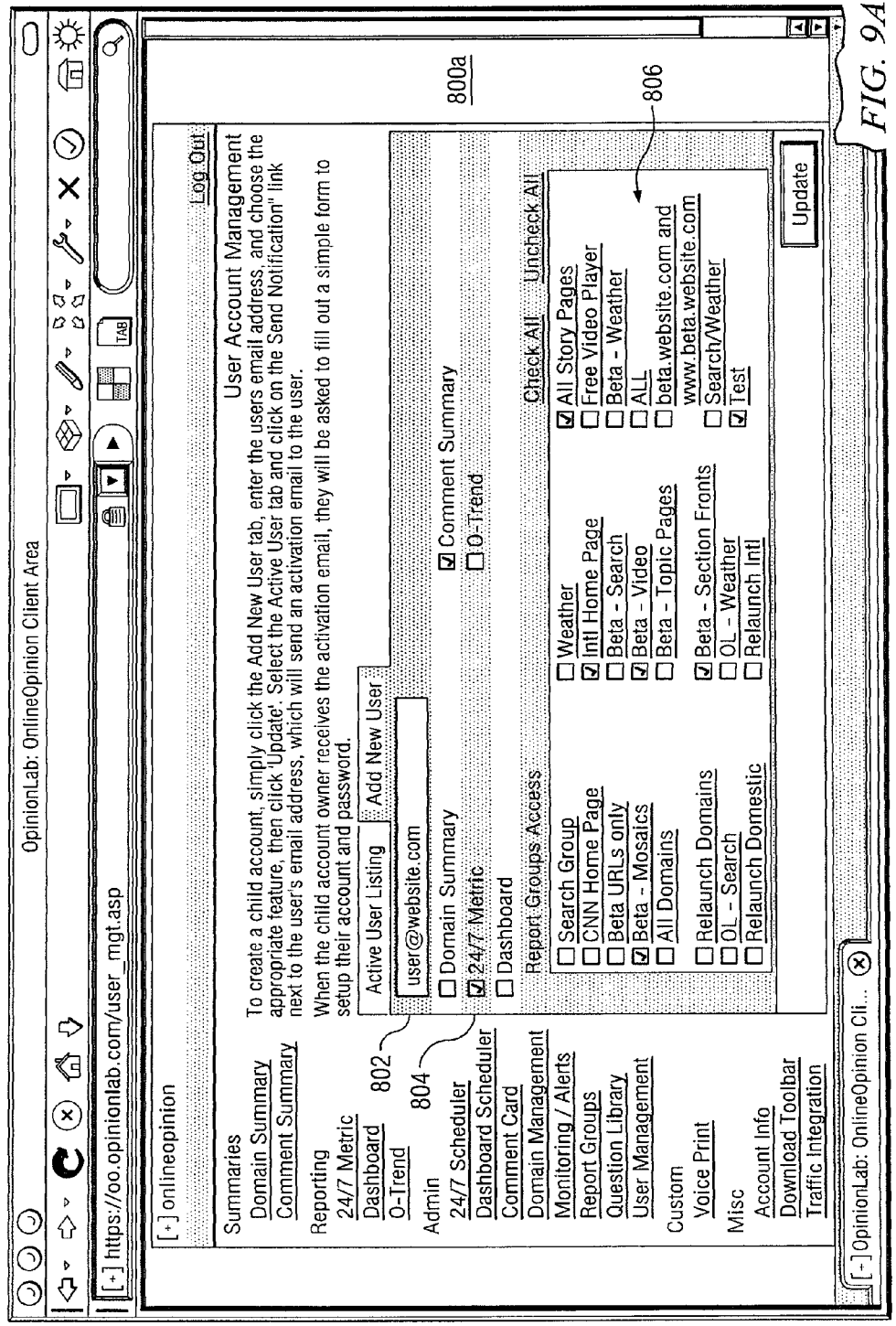
FIGS. 9A-9B illustrate example administrator tools.
Figure 9B:
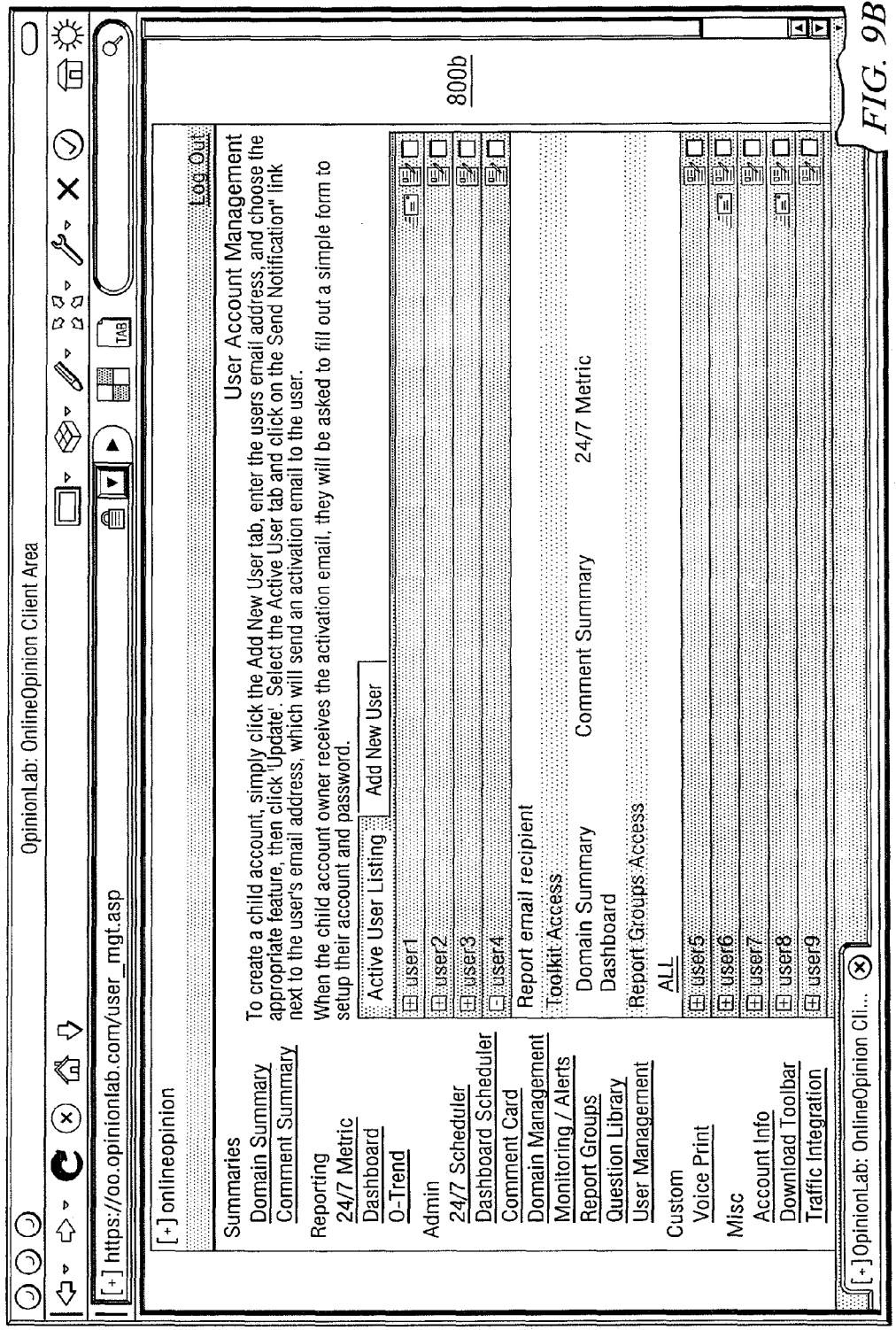

FIGS. 9A-9B illustrate administrator tools 800 that may be used to allocate access to the data collected through user feedback. For example, an administrator may identify a new system user through the use of administrator tool 800a. In certain embodiments, the administrator may identify a new system user in field 802, select certain reports with report selector 804, and grant access to certain report groups with access tool 806. In particular embodiments, a user may be identified by their name, network ID, email address, employee ID, etc. Once system users have been identified and given access to the data collected, certain aspects of this access may be reviewed or modified using administrator tool 800b. As shown in FIG. 9B, a listing of the system users may be presented that allows an administrator to review the associated data and reports assigned to that user. In particular embodiments, in addition to allocating access to particular reports, administrator tools 800 may be used to assign certain alerts to particular system users.

Figure 10A:
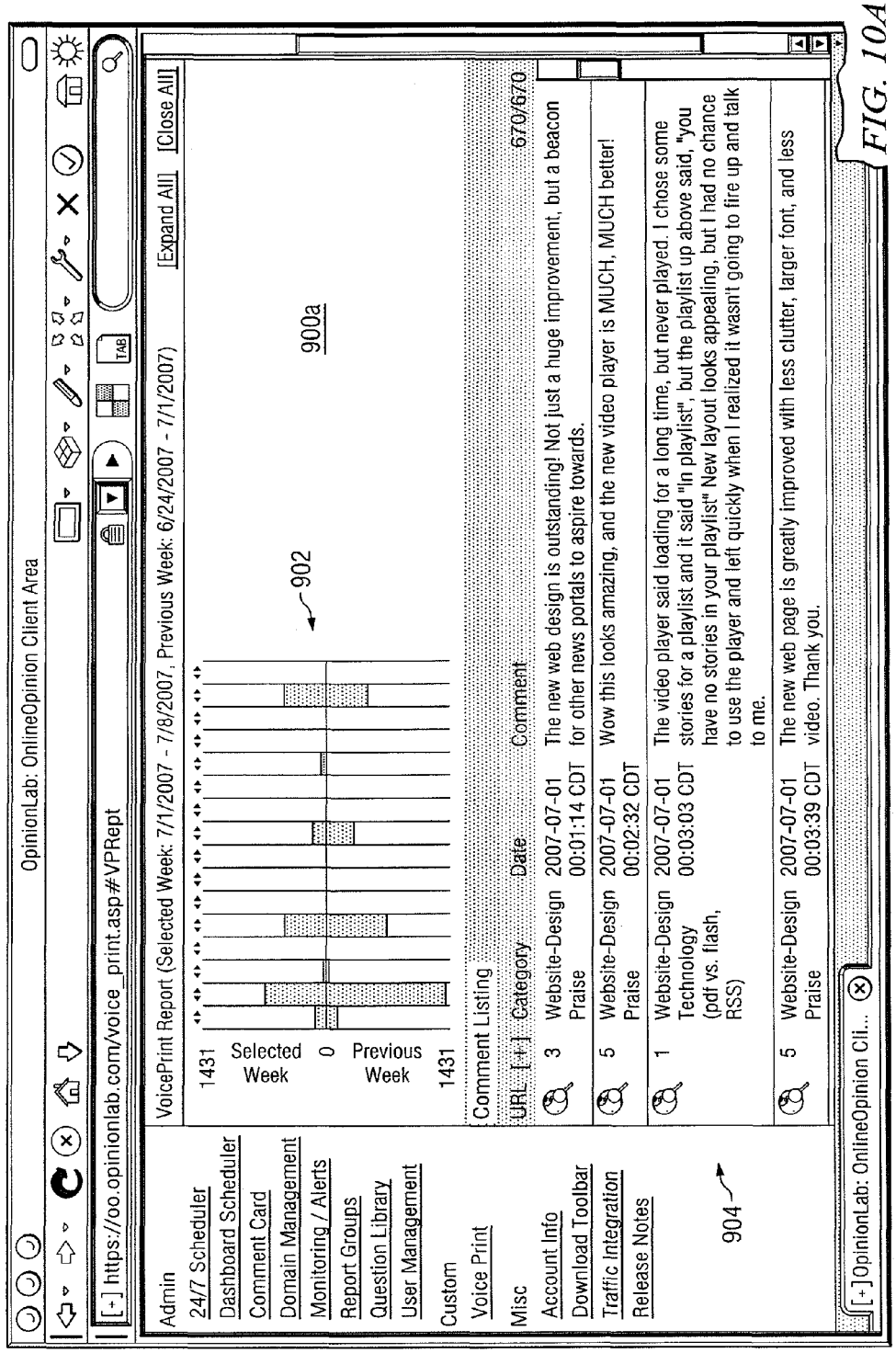
FIGS. 10A-10B illustrate example composite reports.
Figure 10B:
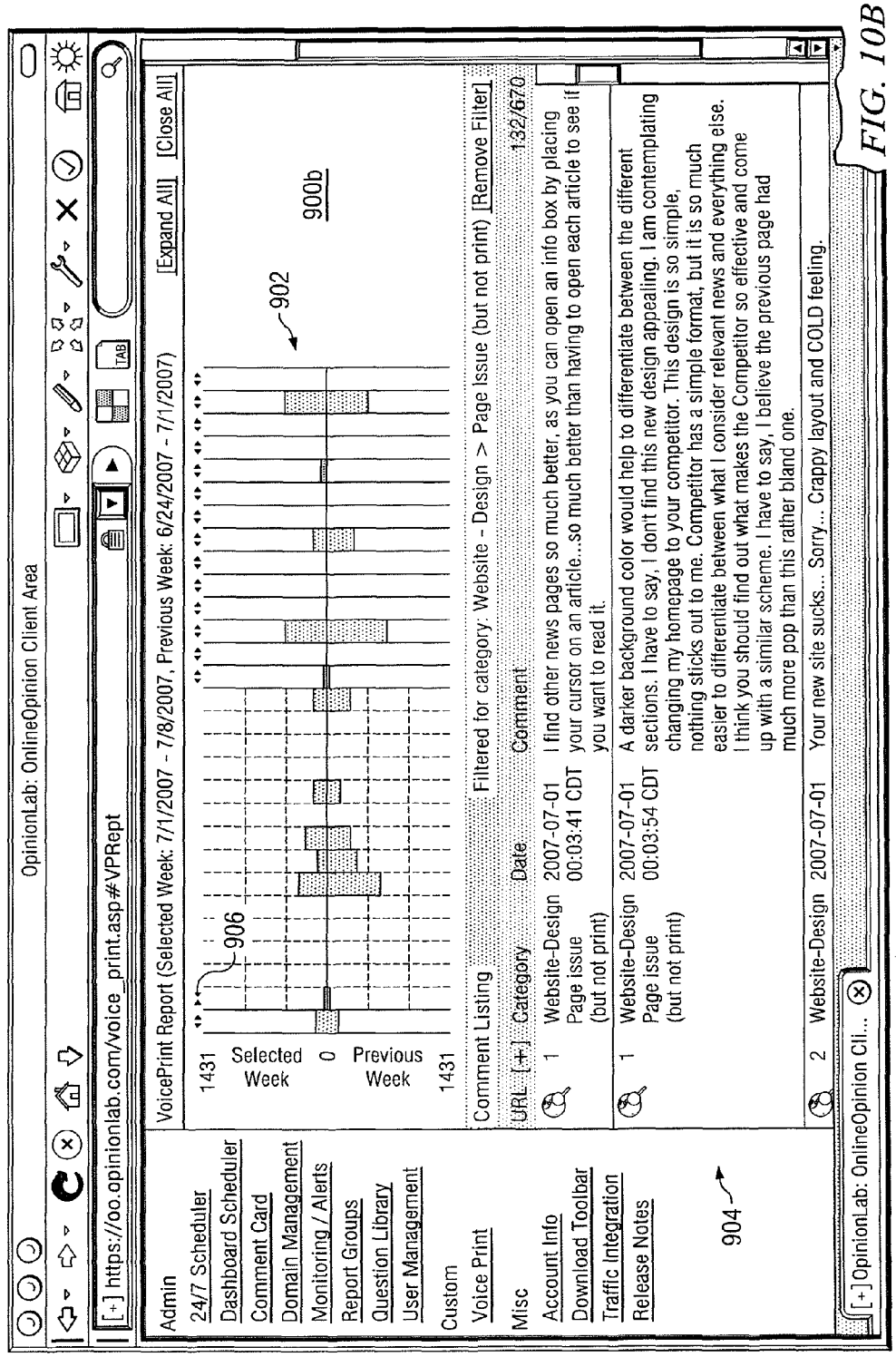

FIGS. 10A-10B illustrate example composite reports 900 that may be utilized to display information about feedback received. In particular embodiments, reports 900 may be updated in real-time (or substantially real-time) as information is received from web site users. As shown in FIG. 10A, composite report 900a includes a bar graph 902, and a list of user comments 904.

Bar graph 902 may be the same or substantially similar to bar graph 504 in report 500. In the embodiment shown, the upper half of bar graph 902 displays information about the volume and nature of the feedback received for a selected week and the lower half of bar graph 904 displays information about the volume and nature of the feedback received for the week previous to the selected week. In certain embodiments, the nature of the feedback may be color coded. For example, positive feedback may be green, negative feedback may be red, and neutral feedback may be black or yellow. As shown in FIG. 10B, by selecting an arrow 906 at the top of bar graph 902, a category of bar graph 904 my expand to provide additional information about subcategories of the category selected.

The list of user comments 904 may include a particular group of user comments related to a particular web page, product, company, etc. The list may be determined by the selection methods discussed above with respect to FIGS. 8A-9B. As shown in FIG. 10A, list 904 may include a link to the URL from which the comment was generated, a comment rating, a category and subcategory of the comment, the date and time the comment was generated, and the text of the comment. In certain embodiments, the comments may be sorted and filtered based on one or more of these criteria or others. For example, as shown in FIG. 10B the comments may be filtered by a category, such as "Page Issue," and a subcategory, such as "Page Issue (but not print)," and may be sorted by date and time. Through the use of these administrative and reporting tools, certain embodiments may provide for efficient and timely assessment of the impact of certain business activities based on user feedback.

Although the present invention has been described with several embodiments, a plenitude of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A computer-implemented method for measuring and reporting business intelligence based on comments collected from web page users using software associated with accessed web pages, comprising:

using a computer system, accessing a plurality of user comments collected from users of one or more web pages using feedback collection software that provides users who access a particular web page a viewable element through which to provide their comments regarding one or more aspects of a business associated with the particular web page;

using the computer system, assigning a rating selected from a plurality of available ratings to each collected user comment based on a subjective assessment of the collected user comment, wherein the subjective assessment comprises a keyword association;

using the computer system, associating each of the plurality of collected user comments with one or more predefined business-related categories of a plurality of predefined business-related categories, wherein the plurality of predefined business-related categories comprises at least two predefined business-related categories selected from the group consisting of customer service, products, marketing, and sales; and using the computer system, generating a report identifying, for each of the plurality of predefined business-related categories, one or more quantitative values derived from the collected user comments associated with that business-related category.

2. The method of claim 1, wherein the feedback collection software provides the viewable element in response to a user indicating a desire to provide page-specific feedback regarding a particular accessed web page while the particular accessed web page is viewable within a browser window.

3. The method of claim 2, wherein the collected user comments comprise page-specific feedback regarding particular accessed web pages in addition to one or more other aspects of the business associated with the particular accessed web pages.

4. The method of claim 1, wherein associating the collected user comments with the predefined business-related categories is performed automatically using a computer system in response to accessing the collected user comments.

5. The method of claim 1, further comprising using the computer system, categorizing the plurality of user comments according to a comment categorization scheme.

6. The method of claim 1, wherein a quantitative value identified in the report for a particular predefined business-related category comprises the quantity of collected user comments associated with that business-related category.

7. The method of claim 1,
wherein a quantitative value identified in the report for a particular predefined business-related category comprises a quantity of collected user comments assigned to a particular rating.

8. The method of claim 7, wherein the report comprises a bar graph comprising a plurality of color-coded bars, each color-coded bar representing a corresponding one of the plurality of predefined business-related categories and each color representing a corresponding one of the plurality of available ratings.

9. The method of claim 7, wherein the plurality of available ratings comprises positive, negative, and neutral ratings.

10. A system for measuring and reporting business intelligence pertinent to a business, comprising software encoded in a computer readable medium and when executed using one or more processors operable to:

access a plurality of user comments collected from users of one or more web pages using feedback collection software that provides users who access a particular web page a viewable element through which to provide their comments regarding one or more aspects of a business associated with the particular web page;

access an assigned rating selected from a plurality of available ratings for each collected user comment based on a subjective assessment of the collected user comment, wherein the subjective assessment comprises a keyword association;

associate each of the plurality of collected user comments with one or more predefined business-related categories of a plurality of predefined business-related categories, wherein the plurality of predefined business-related categories comprises at least two predefined business-related categories selected from the group consisting of customer service, products, marketing, and sales; and generate a report identifying, for each of the plurality of predefined business-related categories, one or more quantitative values derived from the collected user comments associated with that business-related category.

11. The system of claim 10, further comprising the feedback collection software that provides users who access a particular web page a viewable element through which to provide their comments regarding one or more aspects of a business associated with the particular web page.

12. The system of claim 11, wherein the feedback collection software provides the viewable element in response to a user indicating a desire to provide page-specific feedback regarding a particular accessed web page while the particular accessed web page is viewable within a browser window.

13. The system of claim 10, wherein the collected user comments comprise page-specific feedback regarding particular accessed web pages in addition to one or more other aspects of the business associated with the particular accessed web pages.

14. The system of claim 10, wherein the software is further operable, when executed, to categorize the plurality of user comments according to a comment categorization scheme.

15. The system of claim 10, wherein a quantitative value identified in the report for a particular predefined business-related category comprises the quantity of collected user comments associated with that business-related category.

16. The system of claim 10,
wherein a quantitative value identified in the report for a particular predefined business-related category comprises a quantity of collected user comments assigned to a particular rating.

17. The system of claim 16, wherein the report comprises a bar graph comprising a plurality of color-coded bars, each color-coded bar representing a corresponding one of the plurality of predefined business-related categories and each color representing a corresponding one of the plurality of available ratings.

18. The system of claim 17, wherein the plurality of available ratings comprises positive, negative, and neutral ratings.

19. A computer-implemented method for generating an electronically generated business intelligence report, comprising:
generating by a computer system a plurality of category indicators each identifying one predefined business-related category of a plurality of predefined business-related categories, wherein the plurality of predefined business-related categories comprises at least two predefined business-related categories selected from the group consisting of customer service, products, marketing, and sales; and
generating by the computer system a plurality of quantitative indicators identifying, for each of the plurality of predefined business-related categories, one or more quantitative values derived from user comments collected from users of one or more web pages using feedback collection software that provides users who access a particular web page a viewable element through which to provide their comments regarding one or more aspects of a business associated with the particular web page, wherein:
a quantitative value identified in the report for a particular predefined business-related category comprises a quantity of collected user comments assigned to a particular rating, the collected user comments being assigned to one of the plurality of available ratings based on a subjective assessment of each of the collected user comments; and
the subjective assessment comprises a keyword association.

20. The method of claim 19, wherein the feedback collection software provides the viewable element in response to a user indicating a desire to provide page-specific feedback regarding a particular accessed web page while the particular accessed web page is viewable within a browser window.

21. The method of claim 19, further comprising categorizing the plurality of user comments according to a comment categorization scheme.

22. The method of claim 19, wherein a quantitative value identified in the report for a particular predefined business-related category comprises the quantity of collected user comments associated with that business-related category.

23. The method of claim 19, further comprising generating a bar graph, the plurality of quantitative indicators comprising color-coded bars, each color-coded bar representing one of the plurality of predefined business-related categories, and each color representing one of the plurality of available ratings.

24. The method of claim 19, wherein the plurality of available ratings comprises positive, negative, and neutral ratings.

25. The method of claim 23, wherein the bar graph comprises a first half and a second half, the first half being separated from the second half by an axis of the graph.

26. The method of claim 25, wherein first half comprises a mirror-image of the second half.

27. The method of claim 25, wherein the first half comprises a first set of information and the second half comprises a second set of information, the first set of information being different than the second set of information.

28. A computer-implemented method for measuring and reporting business intelligence based on comments collected from web page users using software associated with accessed web pages, comprising:
using a computer system, accessing a plurality of user comments collected from users of one or more web pages using feedback collection software that provides users who access a particular web page a viewable element through which to provide their comments regarding one or more aspects of a business associated with the particular web page;
using the computer system, categorizing the plurality of user comments according to a comment categorization hierarchy;
using the computer system, assigning a rating selected from a plurality of available ratings to each collected user comment based on a subjective assessment of the collected user comment;
using the computer system, associating each of the plurality of collected user comments with at least two categories selected from the group consisting of customer service, products, marketing, and sales;
using the computer system, generating a report identifying, for each of the selected categories, one or more quantitative values derived from the collected user comments associated with the selected categories, wherein:
a quantitative value identified in the report for a particular predefined business-related category comprises a quantity of collected user comments assigned to a particular rating;
the report comprises a bar graph comprising a first half and a second half, the first half being separated from the second half by an axis of the graph;
the first half comprises a first set of color-coded bars and the second half comprises a second set of color-coded bars, the first set of color-coded bars being different from the second set of color-coded bars; and each color-coded bar representing one of the selected categories.

\* \* \* \* \*